United States Patent
Seo et al.

(10) Patent No.: US 10,916,979 B2
(45) Date of Patent: Feb. 9, 2021

(54) LINE-START SYNCHRONOUS RELUCTANCE MOTOR AND ROTOR THEREOF

(71) Applicant: HYOSUNG HEAVY INDUSTRIES CORPORATION, Seoul (KR)

(72) Inventors: Jeong Ho Seo, Gimhae-si (KR); Huai Cong Liu, Seoul (KR); Ju Lee, Seoul (KR)

(73) Assignee: HYOSUNG HEAVY NDUSTRIES CORPORATION, Seoul (KR)

( * ) Notice: Subject to any disclaimer, the term of this patent is extended or adjusted under 35 U.S.C. 154(b) by 0 days.

(21) Appl. No.: 16/328,869

(22) PCT Filed: Aug. 29, 2017

(86) PCT No.: PCT/KR2017/009426
§ 371 (c)(1),
(2) Date: Feb. 27, 2019

(87) PCT Pub. No.: WO2018/044038
PCT Pub. Date: Mar. 8, 2018

(65) Prior Publication Data
US 2019/0190328 A1   Jun. 20, 2019

(30) Foreign Application Priority Data
Aug. 29, 2016 (KR) .................. 10-2016-0110329

(51) Int. Cl.
*H02K 19/14* (2006.01)
*H02K 19/10* (2006.01)
(Continued)

(52) U.S. Cl.
CPC ............ *H02K 1/246* (2013.01); *H02K 1/165* (2013.01); *H02K 19/103* (2013.01); *H02K 19/14* (2013.01); *H02K 21/021* (2013.01)

(58) Field of Classification Search
CPC ...... H02K 1/165; H02K 1/246; H02K 19/103; H02K 19/14; H02K 21/021; H02K 1/22;
(Continued)

(56) References Cited

U.S. PATENT DOCUMENTS 3,210,584 A * 10/1965 Jorgensen .............. H02K 19/14
                                                          310/265
4,782,260 A * 11/1988 Gandhi ................ H02K 17/165
                                                          310/211
(Continued)

FOREIGN PATENT DOCUMENTS

JP      11-146615 A      5/1999
JP      2003-259615 A    9/2003
(Continued)

OTHER PUBLICATIONS

Fujimura et al, Reluctance Motor, Sep. 12, 2003, Mitsubishi Electric, JP 2003259615 (English Machine Translation) (Year: 2003).*

*Primary Examiner* — Quyen P Leung
*Assistant Examiner* — Alexander A Singh
(74) *Attorney, Agent, or Firm* — Novick, Kim & Lee, PLLC; Jae Youn Kim

(57) ABSTRACT

A rotor of a line-start synchronous reluctance motor is provided, which includes: a laminated core comprising multiple laminated core sheets having multiple rotor bar holes formed therein in proximity to the circumference thereof, respectively; end plates fixed to both sides of the laminated core, respectively; rotor bars inserted into the rotor bar holes, respectively; and a rotating shaft coupled to the laminated core to be able to rotate integrally, wherein the core sheets comprise multiple flux barriers and steel plate portions on which the flux barriers are not formed, respectively, and extended ends of the flux barriers may be positioned between the rotor bar holes.

3 Claims, 4 Drawing Sheets

(51) Int. Cl.
*H02K 1/24* (2006.01)
*H02K 1/16* (2006.01)
*H02K 21/02* (2006.01)

(58) Field of Classification Search
CPC .......... H02K 21/46; H02K 19/10; H02K 1/27;
H02K 17/16; H02K 17/165
USPC ....... 310/156.83, 156.84, 265, 162, 166, 211
See application file for complete search history.

(56) References Cited

U.S. PATENT DOCUMENTS

| | | |
|---|---|---|
| 5,559,386 A | 9/1996 | Gurrieri |
| 2013/0214635 A1* | 8/2013 | Yabe ...................... H02K 17/20 |
| | | 310/197 |
| 2015/0295454 A1* | 10/2015 | EL-Refaie ............... H02K 1/26 |
| | | 310/166 |

FOREIGN PATENT DOCUMENTS

| | | | |
|---|---|---|---|
| JP | 2003259615 A | * | 9/2003 |
| JP | 2006-121765 A | | 5/2006 |
| KR | 10-2005-0092193 A | | 9/2005 |

* cited by examiner

LINE-START SYNCHRONOUS RELUCTANCE MOTOR AND ROTOR THEREOF

FIELD OF THE INVENTION

The present invention relates to a line-start synchronous reluctance motor; and more particularly to, the line-start synchronous reluctance motor, which distributes stress concentrated in outer side of a core of a rotor, and its rotor.

BACKGROUND OF THE INVENTION

In general, a line-start synchronous reluctance motor, as a motor which uses a principle of rotary force being generated by change of magnetic resistance caused by rotation of a rotor, is widely used for a compressor, etc. A rotor of the line-start synchronous reluctance motor comprises a core made up of multiple laminated steel sheets, wherein each of the steel sheets has several flux barriers, and a steel part in which the flux barriers are not formed.

When the rotor starts, flow of magnetic flux is blocked off by the flux barriers and magnetic resistance between a direction of the side of the flux barriers, i.e., q-axis, and a direction between individual flux barrier groups, i.e. d-axis, in a circumferential direction of the rotor varies. Reluctance torque is generated by difference between magnetic resistance at the q-axis and that at the d-axis. As the reluctance torque is synchronized with magnetic flux of a stator, it is more dominant than inductive torque generated by a rotor bar. Therefore, the rotor rotates by the reluctance torque at synchronous speed.

However, the flux barriers are generally formed as air space which is created by cutting a steel sheet. To prevent magnetic flux leakage which lowers efficiency of the motor, flux barriers need to be placed in closer proximity to a stator, but when flux barriers were placed in closer proximity to a stator, strength of the rotor itself became weak.

DETAILED EXPLANATION OF THE INVENTION

Technical Problem

The object of the present invention is to provide a rotor of a line-start synchronous reluctance motor whose flux barriers are placed in proximity to a stator while securing strength of the rotor itself.

Means of Solving the Problem

A rotor of a line-start synchronous reluctance motor in accordance with one aspect of the present invention may comprise: a laminated core made up of multiple core sheets, each of which has multiple rotor bar holes in proximity to circumference; end plates fixed on both sides of the laminated core; rotor bars inserted into the individual rotor bar holes; and a rotatable shaft connected with the laminated core to be rotatable in entirety;

wherein the core sheet is equipped with multiple flux barriers and a steel part on which the flux barriers are not formed; and extended ends of the flux barriers may be placed between the rotor bar holes.

Herein, the extended ends of the flux barriers and the rotor bar holes may be alternating with each other.

Herein, the extended ends of the flux barriers and the rotor bar holes may be placed along circumference of the each core sheet at uniform spacings.

Herein, spacings between the rotor bar holes and outer circumference of the each core sheet may be twice less thick than the core sheet.

Herein, the core sheet may include a shaft hole placed in the center which the rotatable shaft passes through; and the multiple flux barriers, with both ends in proximity to the circumference and central regions extruded towards the shaft hole, which are placed at a specific distance apart from each other along radial direction, may be overlapped in parallel.

Herein, width of the individual flux barriers may be gradually reduced towards both ends thereof from the central regions thereof.

A line-start synchronous reluctance motor in accordance with another aspect of the present invention may comprise: a laminated core made up of multiple core sheets, each of which has multiple rotor bar holes in proximity to circumference and multiple flux barriers, with both ends in proximity to the circumference and central regions extruded towards the center, which are placed at a specific distance apart from each other along radial direction; a rotor including individual rotor bars inserted into the individual rotor bar holes; and a stator, placed outside the rotor, with slots on which coils capable of generating magnetic flux are wound, wherein extended ends of the flux barriers may be placed between the rotor bar holes.

Herein, the extended ends of the flux barriers and the rotor bar holes may be alternating with each other.

Herein, spacings between the extended ends of the flux barriers and the rotor bar holes may match up with spacings between the slots.

Herein, spacings between the rotor bar holes and outer circumference of the core sheet may be twice less thick than the core sheet.

Effects of the Invention

If a rotor of a line-start synchronous reluctance motor in accordance with the aforementioned configuration of the present invention is implemented, the present invention may be capable of increasing power conversion efficiency by placing flux barriers in closest proximity to a stator while securing strength of the rotor itself.

DETAILED DESCRIPTION OF THE PREFERRED EMBODIMENTS

Detailed example embodiments to implement the present invention will be explained below by referring to attached drawings.

Upon the explanation of the present invention, terms such as "a first," "a second," etc. may be used to explain a variety of components but the components may not be limited by such terms. The terms are used only for the purpose of distinguishing one component from another. For example, a first component may be named as a second component without being beyond the scope of the right of the present invention and similarly, even a second component may be named as a first one.

If it is mentioned that a component is connected or linked to another component, it may be understood that the component may be directly connected or linked to the another component but also a third component may exist in between them.

The terms used in this specification are used only to explain specific example embodiments and they are not intended to limit the present invention. Unless a context clearly indicates a different meaning, any reference to singular may include plural ones.

In this specification, it may be understood that terms such as "include," or "equip" are intended to designate that features, numbers, steps, movements, components, parts, or their combinations exist; and that existence or addibility of one or more other features, numbers, steps, movements, components, parts, or their combinations are not excluded in advance.

Besides, for clearer explanation, shapes, sizes, etc. of elements in drawings may be exaggerated.

Figure 1:
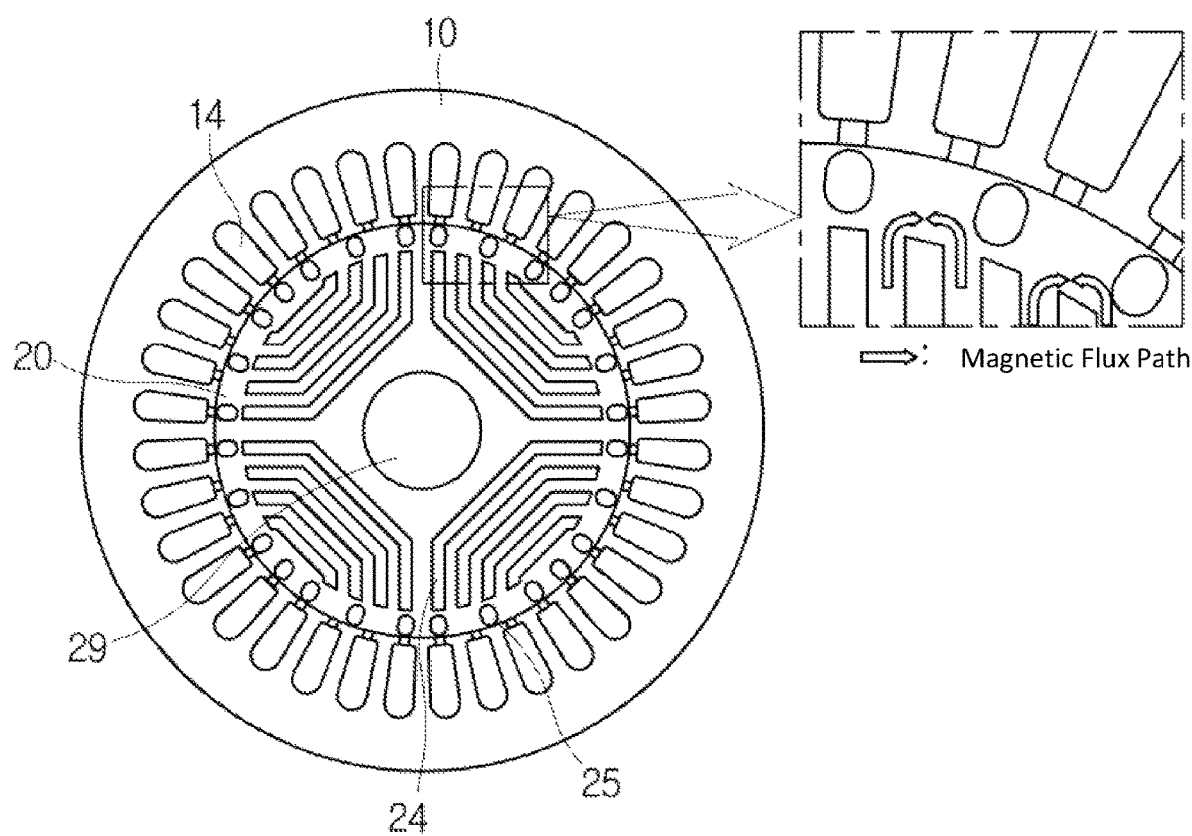
FIG. 1 is a cross-sectional drawing illustrating a structure of a rotor of a line-start synchronous reluctance motor and magnetic flux paths of the rotor if ends of flux barriers are not formed by being extended closer to circumference.

FIG. 1 is a cross-sectional drawing illustrating a structure of a rotor of a line-start synchronous reluctance motor and magnetic flux paths of the rotor if ends of flux barriers are not formed by being extended in proximity to circumference.

A round sheet-shaped rotor 20 illustrated has a shaft hole 29 in its center and its circumference is placed in closest proximity to an inner side of a stator 10. The rotor 20 has punched or cut rotor bar holes 25, which respective rotor bars pass through, and punched or cut flux barriers 24.

Magnetic flux generated by coils wound on slots 14 of the stator 10 has paths as shown in a magnification drawing. It can be found that magnetic flux leakage occurs on circumferential space—e.g., outer space—of the rotor 20 through the paths illustrated.

Figure 2:
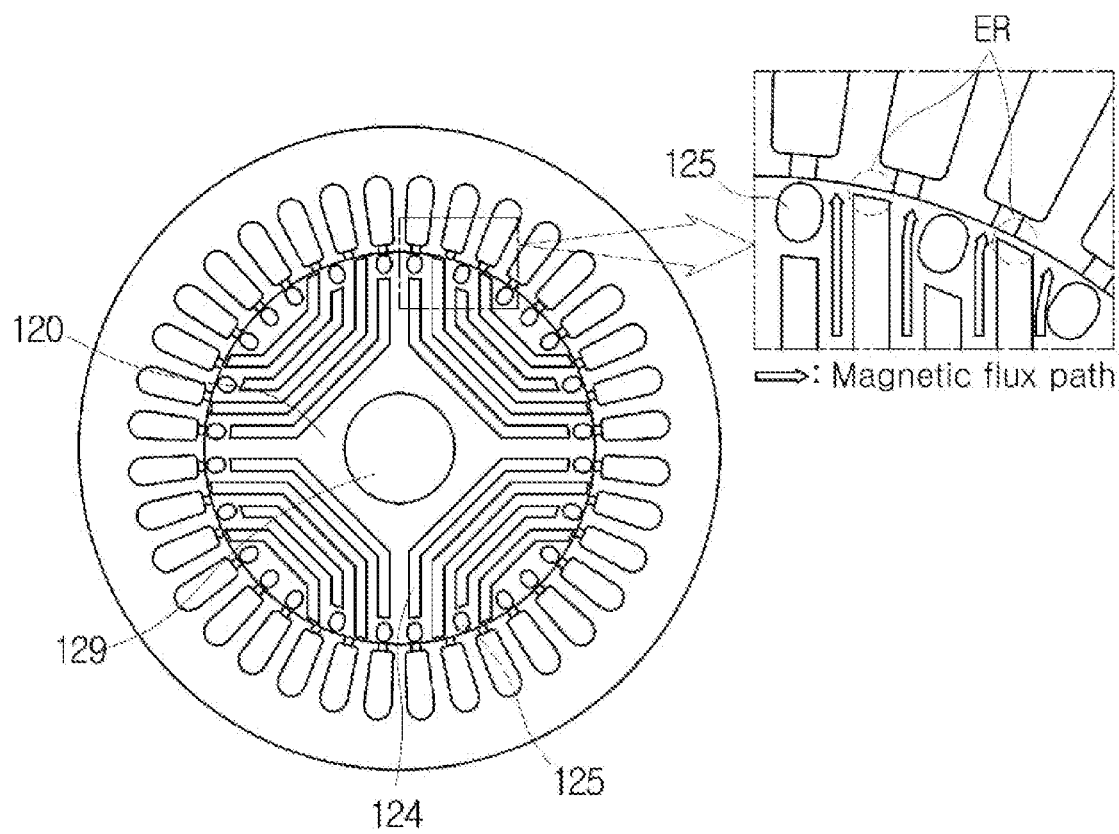
FIG. 2 is a cross-sectional drawing illustrating a structure of a rotor of a line-start synchronous reluctance motor and magnetic flux paths of the rotor if ends of flux barriers are formed by being extended closer to circumference in accordance with one example embodiment of the present invention.

FIG. 2 is a cross-sectional drawing illustrating a structure of a rotor of a line-start synchronous reluctance motor and magnetic flux paths of the rotor when ends of flux barriers are formed by being extended closer to circumference in accordance with one example embodiment of the present invention.

A rotor of the line-start synchronous reluctance motor comprises: a laminated core made up of multiple core sheets 120 where multiple rotor bar holes 125 laminated are formed in proximity of circumference; end plates fixed on both sides of the laminated core; individual rotor bars inserted into the individual rotor bar holes 125; and a rotatable shaft connected with the laminated core which is rotatable in entirety.

It can be found that the core sheets 120 may be manufactured by using magnetic steel sheets such as silicon steel sheet, having multiple flux barriers 124 and a steel part on which the flux barriers 124 are not formed, and extended ends ER of the flux barriers 124 are placed between the rotor bar holes 125.

Herein, each of the round sheet-shaped core sheets 120 may be equipped with: a shaft hole 129 perforated in a central region enough to accept a rotatable shaft; multiple rotor bar holes 125 perforated on the sheet which are placed in almost close proximity with circumference or the outer side of the shaft hole 129 along the circumference at a specific distance from the circumference thereof; and multiple flux barriers 124, with their both ends facing the circumference thereof and their central regions extruded towards the shaft hole 129, which are placed at a specific distance apart from each other along radial direction and are formed symmetrically to and from the shaft hole 129.

Herein, the central regions are straight line-shaped symmetrically to and from the center of the shaft hole 129.

The flux barriers 124 may be filled with a different substance that may block off magnetic flux more effectively but it is general that the flux barriers 124 are formed by being simply punched to become air space due to production costs.

In accordance with another example embodiment, flux barriers whose central regions are in proximity to one side of a tetrahedral shaft hole and whose ends are in proximity to circumference of a core sheet may be C, parabola, or curve-shaped.

Given that even regions punched to form the shaft hole 129 are functioned as flux barriers, the shaft hole in another example embodiment may also be tetrahedron-shaped.

Meanwhile, each of the end plates made of a non-magnetic substance, which are round plate-shaped, may be placed on each of the ends of the laminated core, respectively, along an axis direction of the rotatable shaft.

The respective rotor bars are receptively combined with the respective rotor bar holes 125, being made of aluminum or copper. Besides, the rotor bars may also perform a role in preventing the each core sheet 120 from moving along the direction of the sheet surface.

In accordance with an example embodiment, a means for fixing the rotor bars may be further included. As an example, the means for fixing the rotor bars may be rotor bars-engaging grooves formed on the end plates.

In accordance with another example embodiment, a means for combining laminated core and end plates may be included and one of structures for fixing the core sheets and the end plates by passing through holes, which may be included in flux barriers, formed on the individual core sheets, for fixing them by wrapping outer circumferences of the individual core sheets, and for fixing them by using the rotatable shaft may be included.

As illustrated in FIG. 2, it may be found that multiple rotor bar holes 125 and extended ends ER of flux barriers are alternatively formed on the individual core sheets 120 along the circumferences of the individual core sheets. In the drawing, it can be found that an alternating structure is formed on each quarter-circle circumferential region, and two rotor bar holes 125 are consecutively placed on boundaries between individual quarter-circle circumferential regions without the rotor bar holes and the extended ends ER being alternating.

The individual flux barriers, with their both ends in close proximity to the circumference and their central regions extruded towards the shaft hole, which are placed at a specific distance apart from each other along radial direction, are overlapped in parallel.

Central regions of the individual flux barriers 124 are placed almost at right angles to direction of the other regions separate from the central regions and both ends of the flux barriers are formed in the shape of an arc. Width of the individual flux barriers 124 may be gradually reduced towards the both ends from the central regions and may be set to be increased to be placed on the central region of the each core sheet 120.

Figure 3:
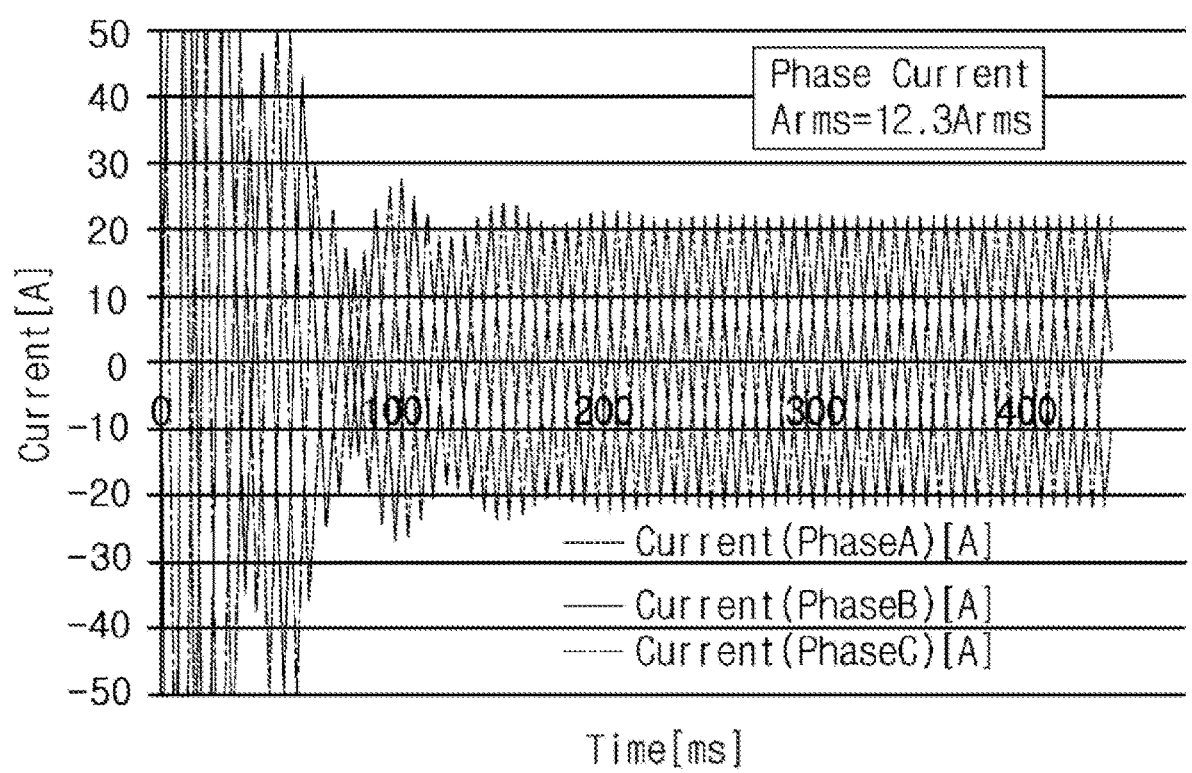
FIG. 3 is a graph showing measured efficiency of a line-start synchronous reluctance motor with a rotor based on a structure illustrated in FIG. 1.
Figure 4:
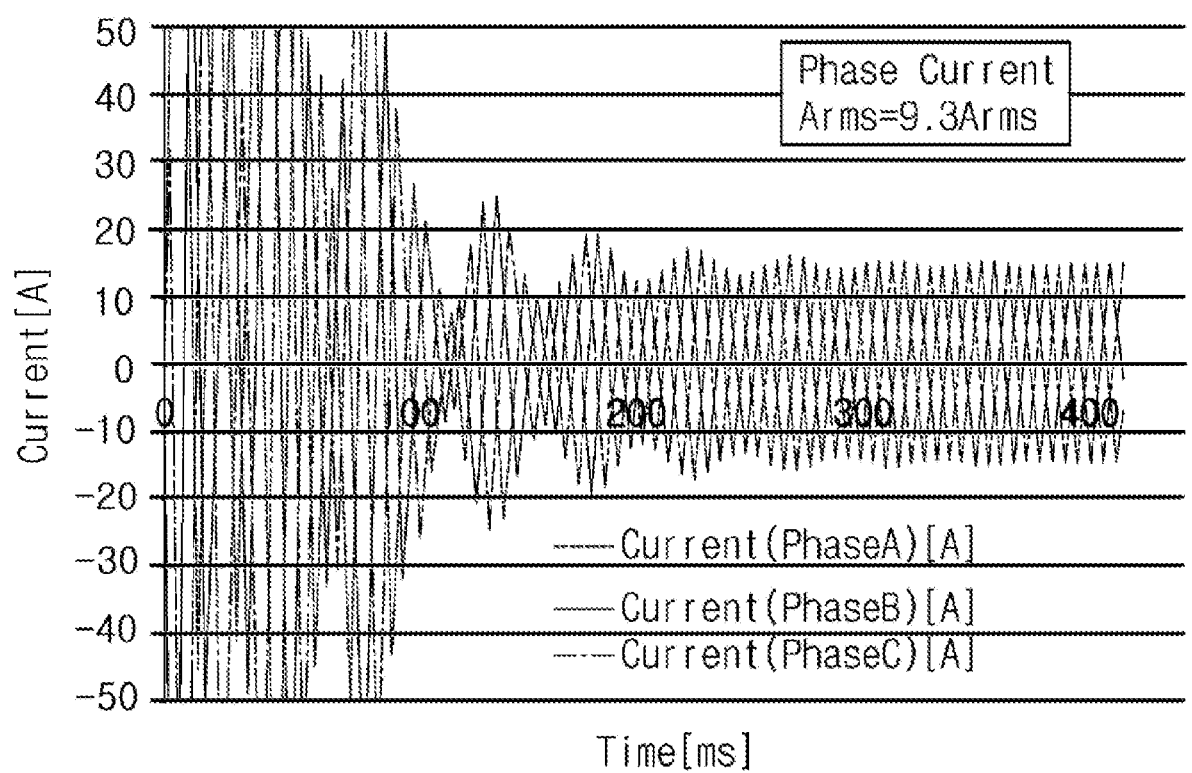
FIG. 4 is a graph showing measured efficiency of a line-start synchronous reluctance motor with a rotor based on a structure illustrated in FIG. 2.

FIG. 3 is a graph showing measured efficiency of a line-start synchronous reluctance motor with a rotor based on the structure illustrated in FIG. 1 and FIG. 4 is a graph showing measured efficiency of a line-start synchronous reluctance motor with a rotor based on the structure illustrated in FIG. 2.

FIG. 3 shows that the effective value of current is 12.3 A as a result of analysis based on a 3.7 kW 4 P motor.

It can be found that, even though the line-start synchronous reluctance motor illustrated in FIG. 1 is manufactured by inserting the rotor bars outside shape of the rotor, leaked magnetic flux paths are formed between rotor bars, thereby reducing d-axis inductance.

Contrarily, FIG. 4 shows that the effective value of current is 9.3 A as a result under the same conditions. The torque current in the drawing can be confirmed to be roughly by 3 [arms] lower than that in FIG. 3. In other words, it can be found that input has been reduced compared to output, thereby improving conversion efficiency of the motor.

This partly results from the increase of saliency ratio by extending the flux barriers to the circumferential part of the rotor, which forms the extended ends ER, and then removing leaked magnetic flux paths generated in FIG. 1.

In sum, it can be found that flux barriers with an illustrated shape of extended ends ER improve power conversion efficiency by effectively blocking off the leaked magnetic flux. When the ends of the flux barriers are simply extended, stiffness may become weak and this may bring deformation of the rotor itself. In the present invention, multiple rotor bars installed near the circumference of the rotor may prevent such deformation enough to make the ends of the flux barriers sufficiently extended.

Spacings between the extended ends or the rotor bar holes and the outer circumference of the each core sheet may have similar values.

For example, spacings between the extended ends or the rotor bar holes and the outer circumference of the each core sheet may effectively block off leaked magnetic flux by being produced twice less thick than the core sheet.

Next, by referring to FIG. 2, the line-start synchronous reluctance motor equipped with the rotor explained above will be explained below.

The line-start synchronous reluctance motor in accordance with the thought of the present invention may comprise: a laminated core made up of multiple core sheets 120, each of which has multiple rotor bar holes 125 in proximity to circumference and multiple flux barriers 124, with both ends in proximity to the circumference and central regions extruded towards center, which are placed at a specific distance apart from each other along radial direction; a rotor 200 including individual rotor bars inserted into the individual rotor bar holes 125; and a stator 10, placed outside the rotor, with slots 14 on which coils capable of generating magnetic flux are wound; wherein extended ends ER of the flux barriers may be placed between the rotor bar holes 125.

In other words, the line-start synchronous reluctance motor in accordance with the thought of the present invention comprises: a rotor 200 in the structure illustrated in FIG. 2, slots 14 on which coils are wound, and a stator 10 placed in closest proximity to the rotor in it.

In FIG. 2, the extended ends ER of the flux barriers 124 of the rotor and the rotor bar holes 125 are alternating with each other. At this time, spacings between the extended ends of the flux barriers 124 and the rotor bar holes 125 may be set to match up with spacings between the slots 14.

Accordingly, this may maximize the power induction effect caused by the flux barriers 124, and even the effect of blocking off the leaked magnetic flux caused by the extended ends.

Spacings between the extended ends ER or the rotor bar holes 125 and the outer circumference of the each core sheet 120 may be set to have similar values.

Through the support by the rotor bars placed in close proximity to the circumference of the rotor, for example, as spacings between the extended ends ER or the rotor bar holes 125 and the outer circumference of the each core sheet 120 are produced to be twice smaller than spacing between the stator and the rotor, leaked magnetic flux may be effectively blocked off.

In the example embodiment illustrated above, it is explained as an example that seven rotor bar holes and four flux barriers are formed on each quarter-circle circumferential region but it is certain that the number of divided regions of each core sheet, the number of rotor bar holes, and the number of flux barriers may be properly adjusted depending on a situation.

It must be noted that the aforementioned example embodiment is for explanation, not for limitation. Besides, it will be understood by those skilled in the art to which the present invention pertains that a variety of example embodiments are possible within the scope of technical thoughts of the present invention.

REFERENCE NUMERALS

120: Core sheets
124: Flux barriers
125: Rotor bar holes
129: Shaft hole
200: Rotor

INDUSTRIAL APPLICABILITY

The present invention, which relates to a line-start synchronous reluctance motor, is available in a field of motors.

What is claimed is:
1. A rotor of a line-start synchronous reluctance motor comprising:
 a laminated core made up of multiple core sheets, each of which has multiple rotor bar holes in proximity to a circumference thereof;
 rotor bars disposed in the rotor bar holes; and
 a rotatable shaft connected with the laminated core,
 wherein the each core sheet has multiple flux barriers and a steel part on which the flux barriers are not formed, and extended ends of the flux barriers are placed between the rotor bar holes,
 wherein the extended ends of the flux barriers and the rotor bar holes are alternating with each other,
 wherein the extended ends of the flux barriers and the rotor bar holes are placed along the circumference of the each core sheet at uniform spacings,
 wherein a space between each of the rotor bar holes and an outer circumference of the each core sheet is twice less than a thickness of the each core sheet, and wherein a space between each of the extended ends and the outer circumference of the each core sheet is twice less than the thickness of the each core sheet.

2. The rotor of claim 1, wherein the each core sheet includes a shaft hole placed in the center which the rotatable shaft passes through, wherein each of the multiple flux barriers has both ends in proximity to the circumference, and wherein central regions of two or more of the multiple flux barriers face towards the shaft hole, the central regions being placed apart from each other at a specific distance along a radial direction, and being arranged in parallel.

3. A line-start synchronous reluctance motor comprising:

a laminated core made up of multiple core sheets, each of which has multiple rotor bar holes in proximity to a circumference thereof and multiple flux barriers, wherein each of the multiple flux barriers has both ends in proximity to the circumference, and wherein central regions of two or more of the multiple flux barriers face towards the center of the each core sheet, the central regions being placed apart from each other at a specific distance along a radial direction;

a rotor including multiple rotor bars disposed in the rotor bar holes; and a stator, placed outside the rotor, having slots on which coils capable of generating magnetic flux are wound, wherein extended ends of the flux barriers are placed between the rotor bar holes, wherein the extended ends of the flux barriers and the rotor bar holes are alternating with each other, wherein spaces between the extended ends of the flux barriers and the rotor bar holes match up with spaces between the slots, wherein a space between each of the rotor bar holes and an outer circumference of the each core sheet is twice less than a thickness of the each core sheet, and wherein a space between each of the extended ends and the outer circumference of the each core sheet is twice less than the thickness of the each core sheet.

* * * * *